March 15, 1955 F. A. WOOD 2,704,052
DEVICE FOR RESTRAINING AND CAPTURING ANIMALS
Filed April 22, 1952
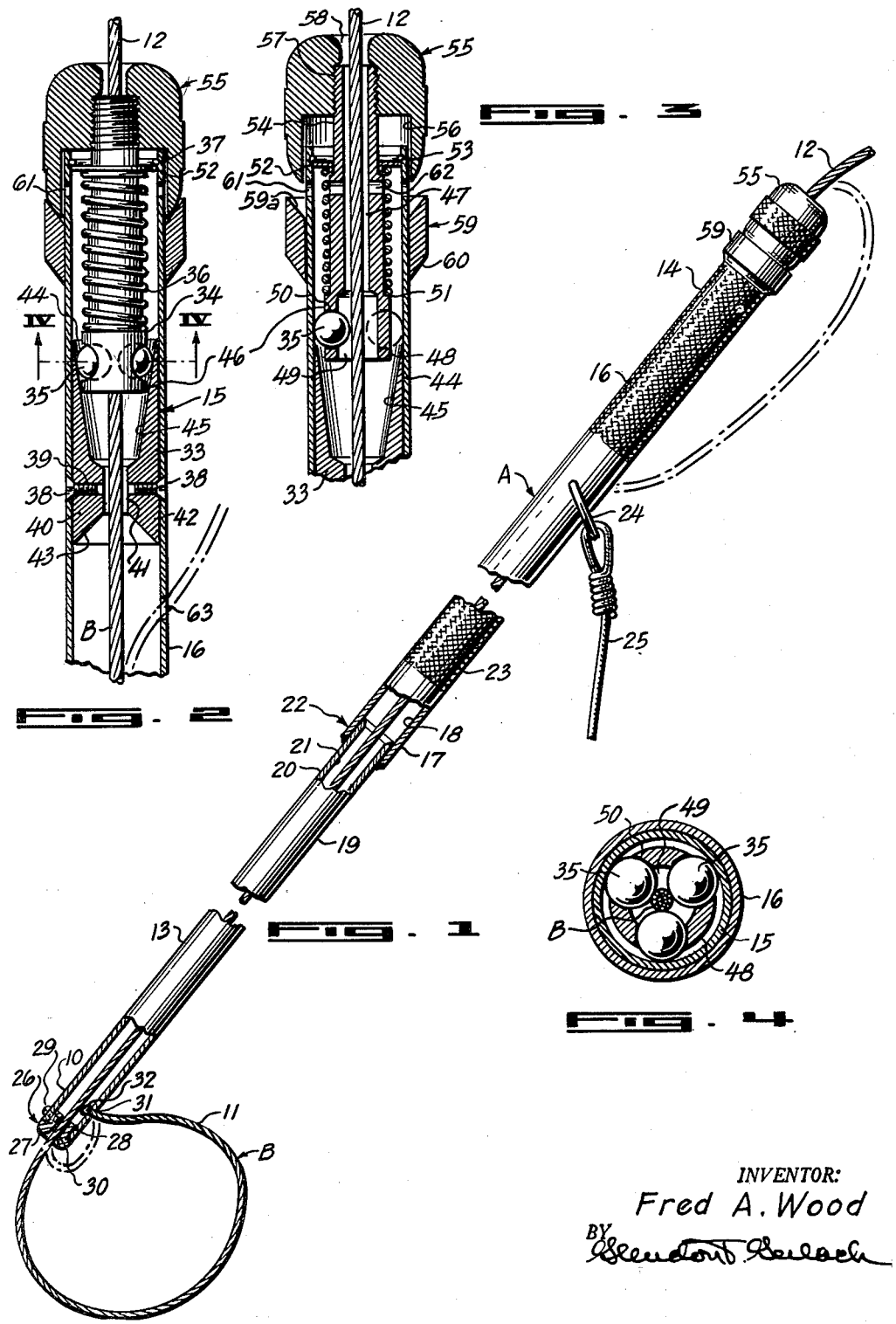
INVENTOR:
Fred A. Wood United States Patent Office 2,704,052
Patented Mar. 15, 1955

2,704,052

DEVICE FOR RESTRAINING AND CAPTURING ANIMALS

Fred A. Wood, San Diego, Calif.

Application April 22, 1952, Serial No. 283,585

4 Claims. (Cl. 119—153)

This invention relates to an improved device for capturing and restraining animals, and is particularly directed to a light-weight, inexpensive and positive acting device for this purpose of the general type which comprises a tubular handle member having a flexible cable secured at its lower end with the free portion of the cable passing through the tubular member in such a manner as to form an adjustable loop or bight adapted to be positioned over the snout, neck, legs, or other parts of an animal to permit the user to capture and control it.

Hunters, zoo keepers, veterinarians, and humane officers frequently have need for capturing and restraining wild and vicious animals without causing permanent injury. While the device of the present invention is primarily for this purpose, it will be obvious that it can be used for killing animals by strangulation if so desired.

One of the primary uses of a device of this character is for capturing alive such animals as raccoons, opossums, bob-cats and the like after they have been treed and where the hunter is required to ascend the tree in order to approach the animal. For this purpose, it is essential that the device be light and easily maneuverable and that it be provided with positive locking means to securely hold the animal after it has been snared. It is additionally desirable that the operation of the device be as simple as possible in order to free the hands of the hunter for other purposes. While restraining devices have heretofore been used comprising a tubular or elongated handle member with a flexible loop-forming member secured at the lower end and having the other end passing through a locking mechanism associated with the tubular member, all of these of which I am aware have depended upon relatively cumbersome and unreliable means for securing the flexible member after the loop has been positioned around the animal. I have found by experience that these known devices are difficult to use and since they are not positive in action, frequently jeopardize the hunter by allowing the captured animal to work loose after capture. Many have protuberant elements forming the locking means which are likely to catch on trees or foliage, inadvertently releasing the device and freeing the animal. In the present invention, a positive-acting locking means is provided entirely encompassed within the confines of the tubular handle of the restraining device which permits quick release with a single simple motion of a hand. The primary object of the present invention is therefore to provide a restraining and capturing device for animals of the general character described having a positive and continuous locking means for the loop forming member and being provided with a simple and effective release means.

A further object is to provide an animal restraining and catching device comprising a tubular handle member with a flexible loop-forming cable secured at the lower end adapted to have its free end passed through the tube, and having a positive locking mechanism continuously engaging the flexible member associated with and completely housed within the upper end thereof.

Still another object of the invention is to provide a device of the type under consideration which is simple, compact, inexpensive, and easily maneuverable.

Other objects and advantages of the invention will be apparent from the following specifications and the drawings. In the latter, like numerals of reference denote similar parts throughout the several views.

In the drawings:

Fig. 1 is a side view of the animal restraining and capturing device of the present invention, in which portions are broken away to more clearly illustrate certain of the details;

Fig. 2 is an enlarged cross-section of the upper end of the restraining device illustrating the improved means for continuously and positively locking the loop forming member;

Fig. 3 is a similar cross-section illustrating the action for releasing the locking means;

Fig. 4 is a section on line IV—IV of Fig. 2.

Referring to the drawings, which illustrate a preferred form of the invention, the animal restraining and capturing device of this invention comprises essentially an elongated tubular body member A and a flexible cable or rope B. The flexible cable B is secured to the lower end 10 of the tubular body member A and passes through the latter to form a loop or bight 11 which may be enlarged or diminished in size by moving the free end 12 of the cable B toward or away from the upper end 14 of the member A. The body member A serves as a handle for maneuvering the loop 11 over the neck or other portion of the animal being captured and to safely hold and control the animal after it has been caught. After the bight 11 has been placed over the animal the operater tightens it by pulling the free end 12 of the cable B away from the body member A with one hand while holding the upper end 14 of the latter with the other. While the bight 11 may be tightened in this manner at the will of the operator on release of the cable B, it is firmly and positively locked against movement towards the lower end 10 by engagement with a locking assembly 15 associated with and housed within the upper end 14 of the body member A, as will be more particularly described.

While the body member A obviously may be of any desired length, I have found that a tubular structure of approximately 5 feet in length provides adequate protection for the user while providing ease of handling and maneuverability. A structure of this length also serves admirably as a staff or pike and is of assistance in climbing, or other similar purpose to the hunter or camper. The body member A must be strong and rigid, and I prefer to form it of steel or the like, although high strength plastic laminates or other similar materials may be readily employed. The body member A is of suitable diameter to permit it to be firmly grasped and held in the hand, and while it may be a unitary structure of straight or tapered tubular form, I have found it somewhat more economical to manufacture and convenient to handle if formed of a tubular upper portion 16 having an external wall portion 17 and an internal wall portion 18, and a tubular lower end portion 19 having an outer wall 20 and an inner wall 21, the latter providing a press fit within the inner wall 18 of the upper tubular member 16. The tubular elements 16 and 19 are telescoped within each other to form an intermediate joint 22 and may be welded or brazed between the lower end of the tube 16 and the outer surface of the tube 19 to form a permanent and rigid connection.

In some cases where it may be desirable to disassemble the device for transportation or storage purposes, it is contemplated that the joint 22 be made disconnectable by providing set screws, bayonet catches, or the like cooperating between the contiguous end portions of the tubes 16 and 19. The outer surface 17 is preferably knurled near the upper end 14 and over a spaced portion 23 to serve as hand grips and assist in preventing slipping or rotation.

A bail 24 is swivably supported in opposed holes adjacent the upper end 14 of the body member A and is adapted for attachment to a cord or lanyard 25 of sufficient strength to assist the operator in using the device, as for instance, in lowering it from a tree after an animal has been snared in the bight 11.

The lower extremity of the body member A is provided with a guide piece 26 having a head portion 27 conforming to the outer surface 20 of the tubular member 13 and an internal projection 28 adapted to fit into the inner surface 21, to which it is secured by means of one or more screws 29. The guide piece 26 is provided with a central bore 30 loosely accommodating the flexible cable B and being rounded at its outer face to freely guide the latter.

A hole 31 is provided adjacent the lower end of the body member A above the guide piece 26 through which one end of the cable B is passed on assembly. The inner end of the cable B is provided with a restriction or enlargement 32 as by welding or brazing so that it cannot pass through the hole 31, thus serving to secure the end of the cable B to the body member A. The free end 12 of the cable B is then passed through the central bore 30 of the guide piece 26 to form the loop or bight 11, and through the center of the tubular body member A and the locking assembly 15.

The locking assembly 15 is supported completely within the tubular upper portion 16 adjacent the upper end 14 of the body member A, and comprises essentially a camming member 33, a cage 34, a series of balls or bearings 35, a compression spring 36, and a retainer spring 37.

Referring particularly to Fig. 2, the camming member 33 is generally cylindrical, fitting within the inner surface 18 of the upper tubular portion 16 and is adapted to be spaced below the open upper end 14 of the latter and secured thereto by means of a pair of screws 38 passing through the wall thereof into suitably tapped holes 39. An intermediate portion 40 of the camming member 33 is provided with a hole or bore 41 loosely accommodating the cable B, joined to the lower end 42 thereof by means of an outwardly tapering surface 43. The upper end 44 of the camming member 33 is defined by a tapered internal wall 45 of circular cross-section converging into the bore 41. The conical wall formed by the tapered surface 43 serves to guide the free end of the cable B into the bore 41 when assembling it through the guide piece 26.

The cage 34 is of generally cylindrical and elongated form having an outer surface 46 of somewhat smaller diameter than that of the camming member 33, and an internal bore 47 adapted to accommodate the cable B. The lower end 48 is provided with a counterbore 49 and a series of equally spaced radial openings 50 having a maximum diameter equal to that of the balls 35, three being shown. Each of the openings 50 is adapted to accommodate one of the balls 35, but are smaller at their inner surfaces in the counterbore 49 than the maximum diameter of the balls 35, so that while the latter may be moved freely in an outwards direction, they cannot pass through the openings inwardly.

In assembly, the lower end 48 of the cage 34 having the balls 35 disposed in the openings 50 is adapted to fit within the upper end 44 of the camming member 33 in such a manner that the outer surfaces of the balls 35 engage the tapered material wall 45 of the latter, forcing the balls 35 inwardly when the cage 34 is disposed towards the lower end of the body member A, and permitting them to move outwardly when the cage 34 is moved upwardly towards the upper end 14. The balls 35 are of such diameter that when they are disposed within the tapered internal wall 45 of the camming member 33, their adjacent inner surfaces bear against the cable B when the latter is passed through the bores 41 and 47 of the camming member 33 and the cage 34 respectively, thus locking the latter against movement therein. When the cage 34 is moved upwardly, the balls 35 are released from engagement with the camming member 33 freeing the cable B for movement.

The compression spring 36 is adapted for support around the cage 34 and its lower end bears against a shoulder 51 formed as an undercut of the outer surface 46 of the latter. A washer 52 is provided having an external diameter adapted to fit within the tubular portion 16 and a central hole accommodating the cage 34. The inner surface 21 of the tubular member 16 is provided with a recess 53 adjacent the open upper end 14 of the body member A adapted to support the retainer spring 37. On assembly, the washer 52 is disposed above the spring 36, and the cage assembly 34 is retained in position by the retainer 37. The action of the spring 36 between the washer 52 and the shoulder 51 biases the cage 34 towards the camming member 33, engaging the balls 35 against the tapered surface 45 and forcing them inwardly to grip and lock the cable B and thus serving as a continuous and positive lock against moving the latter towards the bight 11, while permitting free movement of the cable B in the direction of the free end 12.

The upper end 54 of the cage 34 is adapted to extend through and above the open upper end 14 of the body member A and is threaded to support a release handle 55. The latter is generally cylindrical and is provided with a counterbore 56 in one end having clearance with the outer surface 17 of the tubular upper member 16 to cooperate with the outer surface 17. The upper and lower edges of the handle 55 are rounded to present a smooth exterior contour. A central bore 57 is adapted to engage the threaded upper end 54 of the cage 34 and a central axial hole 58 is provided through which the cable B is adapted to pass on assembly.

A guard 59 is provided having an outer surface conforming in diameter to the outer surface of the release handle 55 and is adapted to be secured as by brazing to the outer surface 17 of the tubular upper member 16 below the release handle 55, so that the curved lower edge of the latter lies within a recess formed by an inwardly inclined edge 59a when the release handle 55 and locking assembly 15 are in their operative positions. The lower edge of the guard 59 is formed by an outwardly inclined surface 60 to provide a faired contour with the surface 17.

It will be seen from Fig. 3, that when the release handle 55 is raised by holding the body member A with one hand, and pulling the release handle 55 with the other, the cage 34 is moved so that the balls 35 do not engage the camming member 33, thus releasing the cable B in order that an object restrained in the bight 11 is released. The guard 59 prevents inadvertent release of the device caused by the body member A slipping through the hands of the operator.

To facilitate assembly and disassembly of the locking assembly 15, a pair of diametrically opposed openings 61 are provided in the upper end 14 of the tubular member 16 which correspond and align with a radial opening 62 in the cage 34 when the release handle 55 is in its releasing position. A wire, nail, or awl may be inserted through the openings 61 and 62 to lock the tubular member 16 and the cage 34 against relative rotation so that the release handle 55 may be tightened or loosened.

It thus may be seen that while the present invention embodies a positive and continuous locking means, it is substantially confined within the contours of the body member A and presents no external irregularities that might cause inadvertent operation or disassembly of the device.

A hole 63 is provided through the upper tubular element 16 below the camming member 33 of sufficient diameter to accommodate the cable B. For ease and convenience in carrying the device of the present invention, the free end 12 of the cable B may be withdrawn to substantially close the bight 11 as shown in dashed lines, and the free end 12 then disposed within the body member A through the hole 63 so that the entire assembly is compact and easily handled, yet requires but a short time to place in readiness for operation.

The present invention is characterized as a device for capturing and restraining wild animals of the general type described, having new and improved means for continuously and positively locking the loop-forming element whereby a one-way locking mechanism is substantially contained within the contours of the body member, thus providing a simple, compact device in which the dangers of inadvertent operation are minimized or eliminated.

Having thus described my invention, that which I claim to be new and desire to secure by Letters Patent is:

1. An animal capturing and restraining device of the class described comprising an elongated tubular body member, a flexible loop-forming member having one end secured adjacent the lower end of said body member, and being adapted to pass through said tubular body member with its free end adjustably extending through the open upper end thereof, a resiliently biased ball-type locking means supported in said tubular body member normally adapted to continuously engage a portion of said flexible loop-forming member within said tubular body member preventing movement of said loop-forming member toward the lower end of said body member while permitting movement of the free end of said flexible member away from the upper end thereof, and a release handle substantially conforming to the exterior contours of said body member and being supported for axial movement therefrom having an operative connection with said locking member to release said balls from engagement with said flexible member on movement of said release handle away from the upper end of said tubular body member.

2. In combination with a device of the class described comprising an elongated tubular body member serving as a handle and a flexible loop-forming member secured at the lower end thereof adapted to be passed through said body member with its free end extending beyond the open upper end thereof for adjustment of the size of the loop, locking means supported entirely within said tubular member normally engaging a portion of said flexible member therein to control movement thereof, a release handle conforming substantially to the outer contours of said body member supported for axial movement on said body member operatively connected to said locking means, and a guard member supported on said body member cooperating with and covering the lower edge of said release handle to prevent inadvertent movement of the latter resulting from axial movement of the hands on said body member.

3. In a device of the class described comprising an elongated tubular body member serving as a handle and a flexible loop-forming member secured at the lower end thereof and being adapted to be passed through said body member with its free end extending beyond the open end thereof for adjustment of the size of the loop, one-way locking means housed and supported entirely within said tubular member normally preventing movement thereof toward the lower end of said body member while permitting adjusting movement of said flexible member in the other direction, said locking means comprising a sleeve secured within said body member having a central opening adapted for the passage of said flexible member and a conical camming surface inclined inwardly towards the lower end of said body member, a generally tubular cage supporting a plurality of balls adapted to engage said camming surface and a portion of said flexible member, a compression spring associated with said cage adapted to normally urge said balls into engagement with said camming surface and said flexible member, and a release handle operatively associated with the upper end of said body member and conforming substantially to the outer contours thereof connected to said cage and adapted to be moved axially with respect to said body member to disengage said balls from said camming surface against the action of said compression spring.

4. In a device of the class described comprising an elongated tubular body member serving as a handle and a flexible loop-forming member secured at the lower end thereof and being adapted to be passed through said body member with its free end extending beyond the open upper end thereof for adjustment of the size of the loop, one-way locking means housed and supported entirely within said tubular member normally preventing movement thereof toward the lower end of said body member while permitting adjusting movement of said flexible member in the other direction, said locking means comprising a sleeve secured within said body member having a central opening adapted for the passage of said flexible member and a conical camming surface inclined inwardly towards the lower end of said body member, a generally tubular cage supporting a plurality of balls adapted to engage said camming surface and a portion of said flexible member, a compression spring associated with said cage adapted to normally urge said balls into engagement with said camming surface and said flexible member, a release handle operatively associated with the upper end of said body member and conforming substantially to the outer contours thereof connected to said cage and adapted to be moved away from the upper end of said body member to disengage said balls from said camming surface against the action of said compression spring and a guard supported on said body member below said release handle partially enclosing the latter to prevent inadvertent movement thereof as a result of axial movement of the hands on said body member.

References Cited in the file of this patent

UNITED STATES PATENTS

| | | |
|---|---|---|
| 511,148 | Jones | Dec. 19, 1893 |
| 873,514 | Davis | Dec. 10, 1907 |
| 1,350,123 | Theodore | Aug. 17, 1920 |
| 1,382,520 | Lundene | June 21, 1921 |
| 1,623,774 | Bell | Apr. 5, 1927 |
| 1,716,631 | Gow | June 11, 1929 |

FOREIGN PATENTS

| | | |
|---|---|---|
| 1,782 | Great Britain | 1913 |